US011003902B2

(12) United States Patent
Tatsumi

(10) Patent No.: US 11,003,902 B2
(45) Date of Patent: May 11, 2021

(54) IMAGE IDENTIFICATION APPARATUS AND NON-TRANSITORY COMPUTER READABLE MEDIUM

(71) Applicant: FUJI XEROX CO., LTD., Tokyo (JP)

(72) Inventor: Daisuke Tatsumi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 433 days.

(21) Appl. No.: 15/914,361

(22) Filed: Mar. 7, 2018

(65) Prior Publication Data

US 2019/0057253 A1  Feb. 21, 2019

(30) Foreign Application Priority Data

Aug. 15, 2017  (JP) .............................. JP2017-156881

(51) Int. Cl.
*G06K 9/00* (2006.01)
*G06T 7/174* (2017.01)
*G06K 9/20* (2006.01)

(52) U.S. Cl.
CPC ..... *G06K 9/00449* (2013.01); *G06K 9/00456* (2013.01); *G06K 9/00463* (2013.01); *G06T 7/174* (2017.01); *G06K 2009/2045* (2013.01)

(58) Field of Classification Search
CPC combination set(s) only.
See application file for complete search history.

(56) References Cited

U.S. PATENT DOCUMENTS

| 5,048,107 A | 9/1991 | Tachikawa | |
|---|---|---|---|
| 6,453,069 B1* | 9/2002 | Matsugu | G06K 9/48 382/173 |
| 8,977,005 B2* | 3/2015 | Hirakawa | G06K 9/3241 382/103 |
| 9,305,235 B1* | 4/2016 | Bogan | G06T 7/73 |
| 2014/0362248 A1* | 12/2014 | Ishida | H04N 5/142 348/222.1 |
| 2015/0228063 A1* | 8/2015 | Minakawa | G06K 9/52 382/151 |
| 2016/0132744 A1* | 5/2016 | Choi | G06K 9/4604 382/173 |
| 2019/0057253 A1* | 2/2019 | Tatsumi | G06K 9/00456 |

FOREIGN PATENT DOCUMENTS

| JP | 2940936 B2 | 8/1999 |
|---|---|---|
| JP | 3157414 B2 | 4/2001 |
| JP | 3420864 B2 | 6/2003 |

* cited by examiner

*Primary Examiner* — Iman K Kholdebarin
(74) *Attorney, Agent, or Firm* — Oliff PLC

(57) ABSTRACT

An image identification apparatus includes an extraction unit, an excluding unit, and an identification unit. The extraction unit extracts lines from an image. The exclusion unit excludes from objects to be identified a boundary delimiting an entire area of the image among the extracted lines. The identification unit identifies as an object multiple lines that are among the extracted lines and that are not excluded by the exclusion unit if the multiple lines are connected to each other.

20 Claims, 13 Drawing Sheets

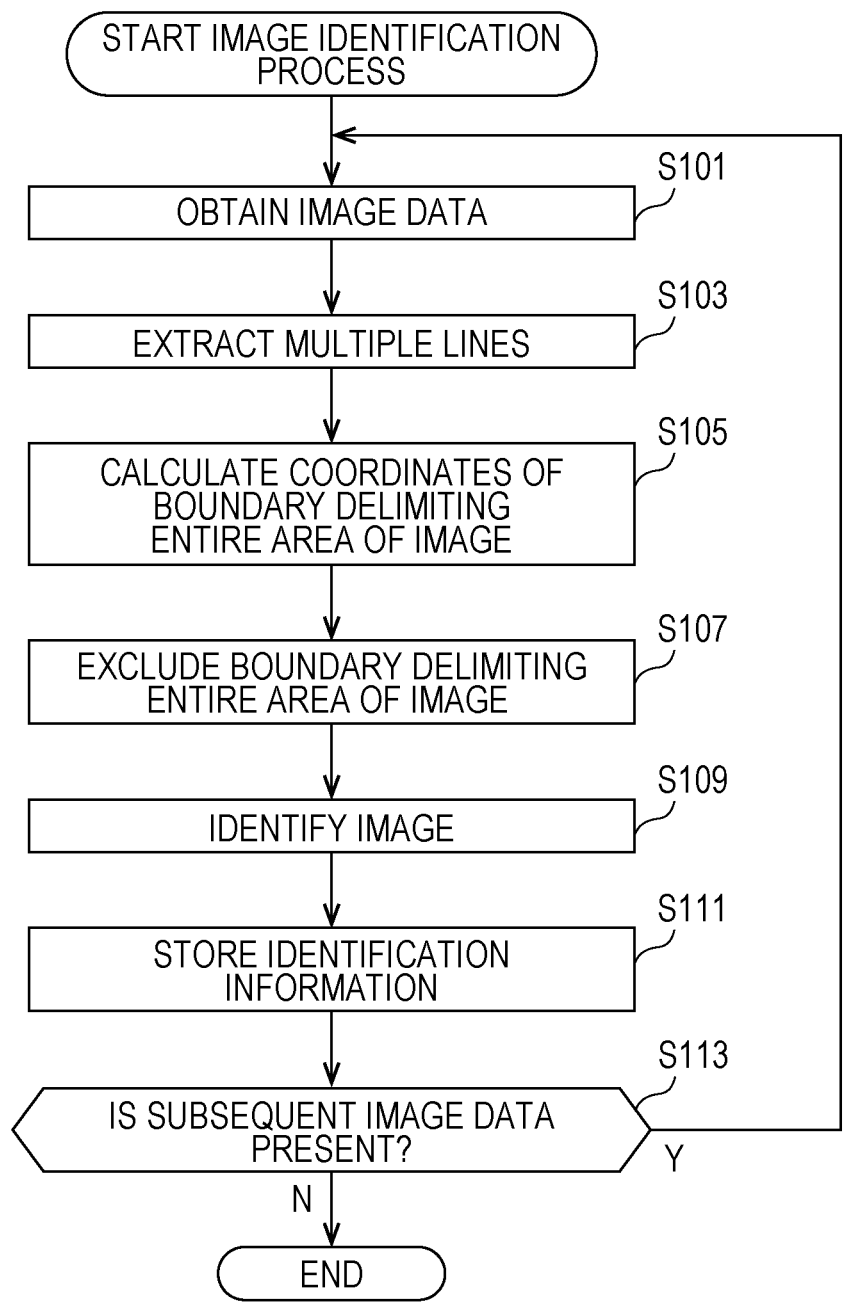

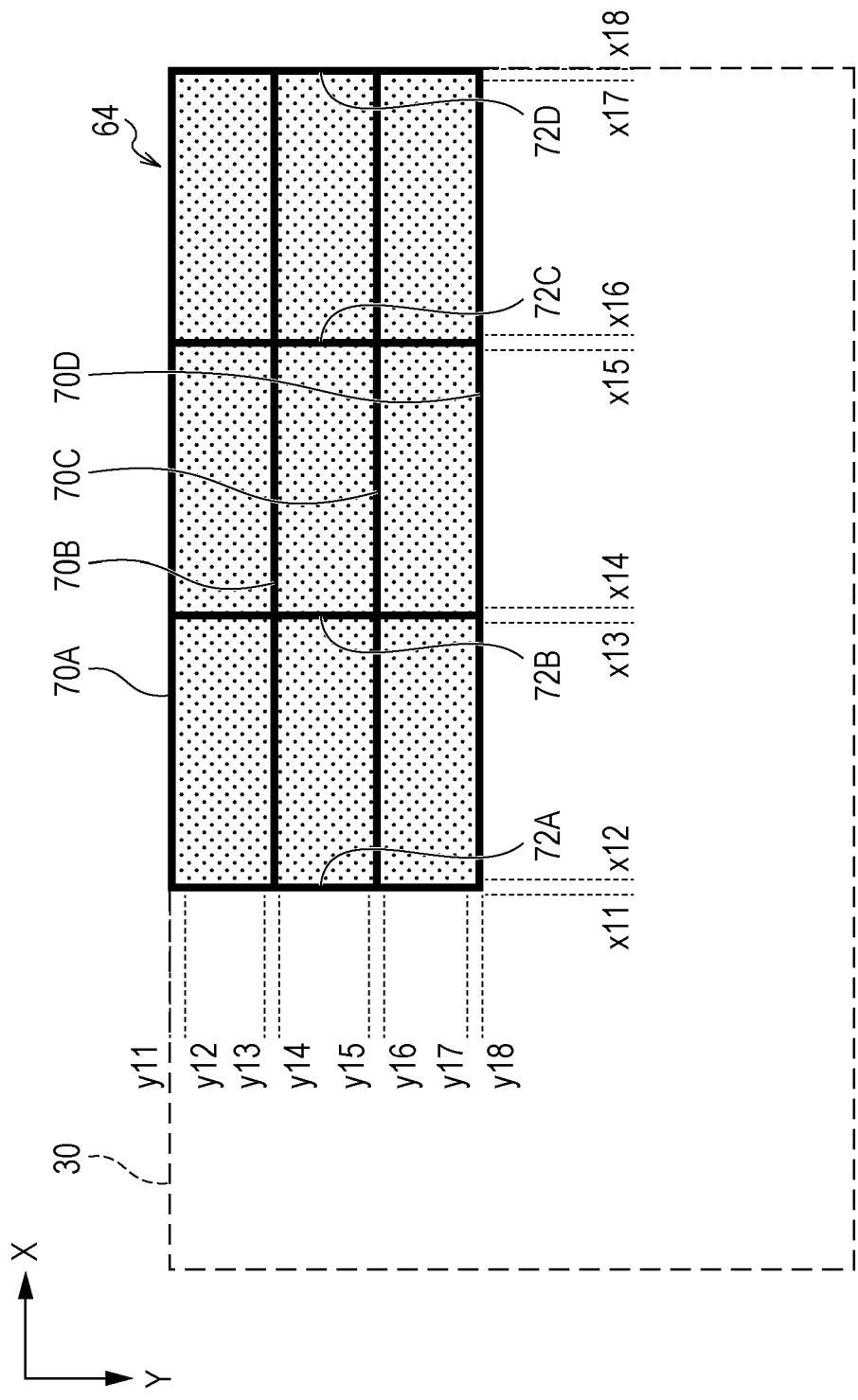

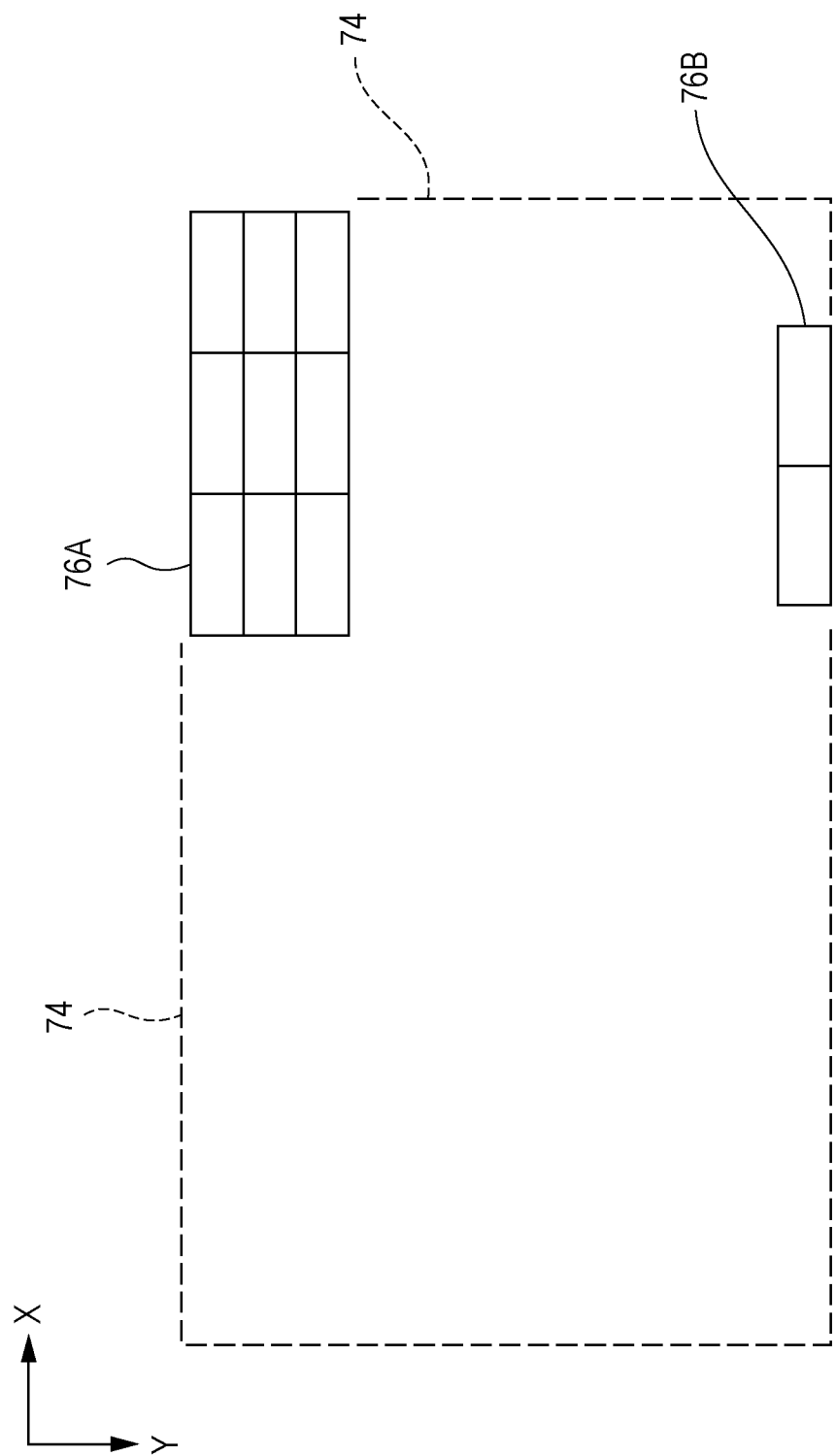

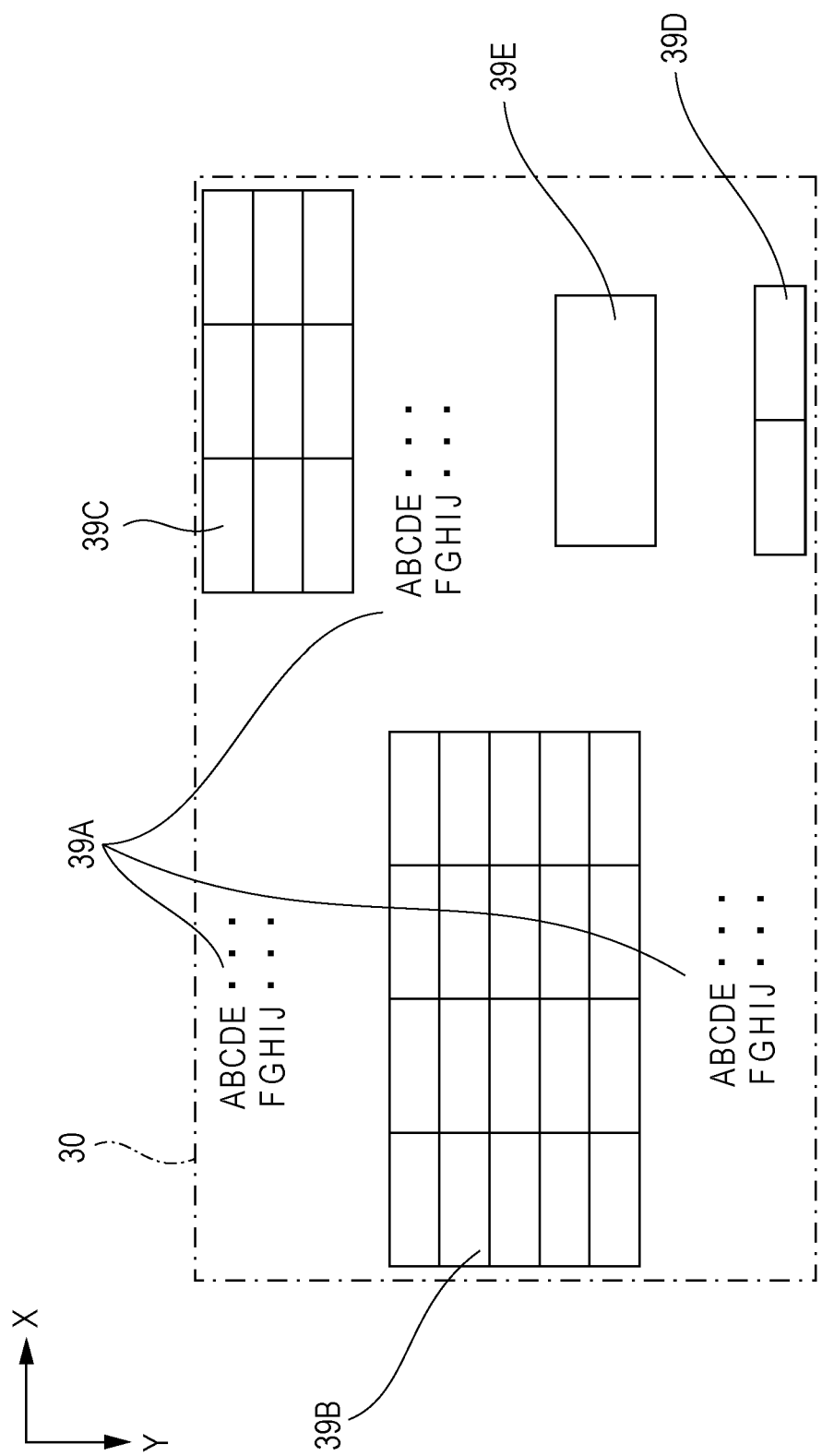

IMAGE IDENTIFICATION APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-156881 filed Aug. 15, 2017.

BACKGROUND

(i) Technical Field

The present invention relates to an image identification apparatus and a non-transitory computer readable medium.

(ii) Related Art

When image recognition is performed, objects to be recognized in an image are sometimes connected to other objects. Examples of this kind include an image frame of a drawing in contact with ruled lines in a table region and lines for delimitation that overlap a figure.

SUMMARY

According to an aspect of the invention, there is provided an image identification apparatus including an extraction unit, an exclusion unit, and an identification unit. The extraction unit extracts lines from an image. The exclusion unit excludes from objects to be identified a boundary delimiting an entire area of the image among the extracted lines. The identification unit identifies as an object multiple lines that are among the extracted lines and that are not excluded by the exclusion unit if the multiple lines are connected to each other.

BRIEF DESCRIPTION OF THE DRAWINGS

Exemplary embodiments of the present invention will be described in detail based on the following figures, wherein:

FIG. 7 is a flowchart illustrating an image identification process according to the first exemplary embodiment;

FIG. 9A is a schematic diagram illustrating an example of an identification method of a table by the image identification apparatus according to the second exemplary embodiment;

FIG. 10 depicts a front view of an example of a boundary delimiting an entire area of an image and tables that are identified by the image identification apparatus according to the second exemplary embodiment;

FIG. 11 depicts a front view of an example of an image identified by the image identification apparatus according to the second exemplary embodiment.

DETAILED DESCRIPTION

Hereinafter, exemplary embodiment of the present invention will be described in detail with reference to the attached drawings.

First Exemplary Embodiment

Figure 1:
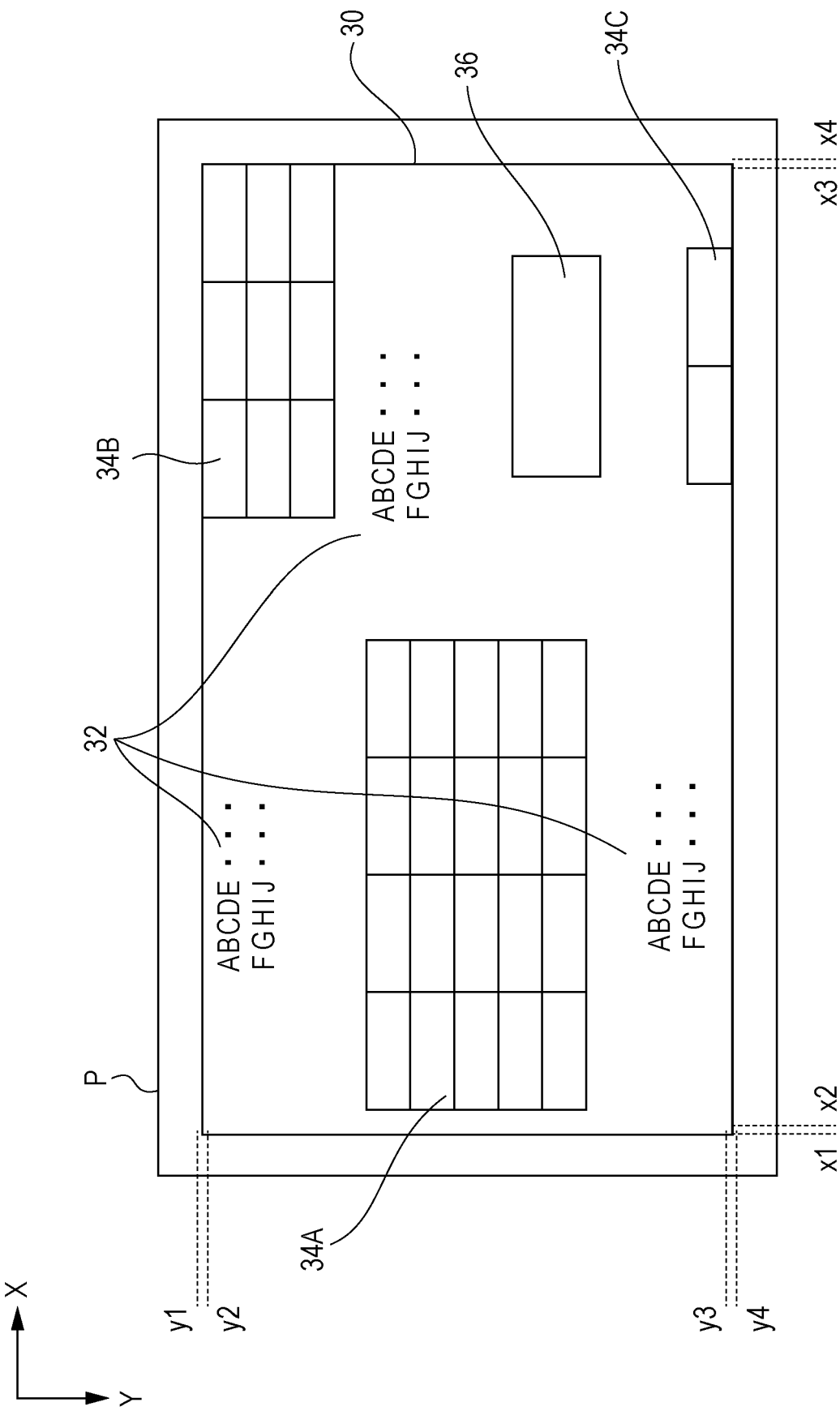
FIG. 1 depicts a front view of an example of a sheet on which an image to be identified by an image identification apparatus according to exemplary embodiments is formed.

First, an image to be identified by an image identification apparatus according to this exemplary embodiment will be described. FIG. 1 depicts a front view of an example of a sheet, which is a recording medium, on which the image to be identified by the image identification apparatus according to this exemplary embodiment is formed.

As depicted in FIG. 1, for example, a boundary 30 delimiting the entire area of an image may be drawn on a sheet P on which an image (for example, a construction drawing) to be identified by the image identification apparatus is formed. The phrase "a boundary delimiting the entire area of an image" indicates an outer frame, an image frame, or the like that delimits the entire area of an image. The boundary delimiting the entire area of an image is not limited to a rectangular or substantially rectangular image frame depicted in FIG. 1 and may be a long line that is in contact with and extends over a table, a figure, or the like, or may have a shape such as a quadrilateral having rounded corners, a circle, an ellipse, a triangle, or any other polygon. In this exemplary embodiment, a description will be given of a case where the boundary 30 delimiting the entire area of the image is an image frame that is rectangular or substantially rectangular in shape.

In this exemplary embodiment, as depicted in FIG. 1, for example, a description will be given of a case where regions such as character regions 32 in which text is displayed, table regions 34A, 34B, and 34C in which tables are displayed, and a picture region 36 in which pictures are displayed, are placed inside an area enclosed by the boundary 30 delimiting the entire area of the image.

The table regions 34B and 34C are generally displayed so as to be in contact with the boundary 30 delimiting the entire area of the image. Thus, when the image drawn on the sheet P is to be analyzed, the boundary 30 delimiting the entire area of the image, the table region 34B, and the table region 34C are treated as a single table. In other words, a portion excluding the table region 34B and the table region 34C in the image drawn on the sheet P is treated as a single region, and information in the image is not analyzed correctly.

Further, the table regions 34B and 34C are treated as forming a single table and thus not analyzed correctly. The table regions 34B and 34C form different tables and contain different contents. Accordingly, each of the table regions 34B and 34C needs to be identified as a separate table.

Thus, the image identification apparatus according to this exemplary embodiment extracts lines from an image provided by image data and excludes from objects to be identified a boundary delimiting the entire area of the image among the extracted lines. Then, if multiple lines that are among the extracted lines and that are not excluded are connected to each other, the multiple lines that are connected to each other are identified as an object.

Figure 2:
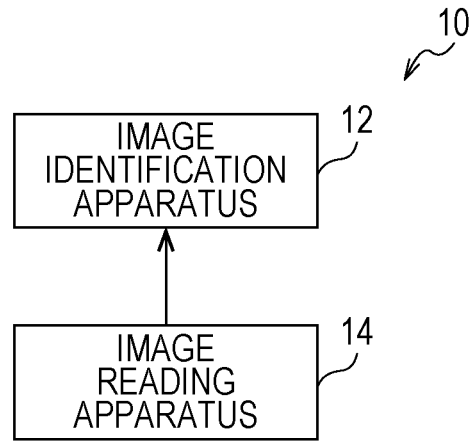
FIG. 2 is a block diagram illustrating an image identification system according to the exemplary embodiments.
Figure 3:
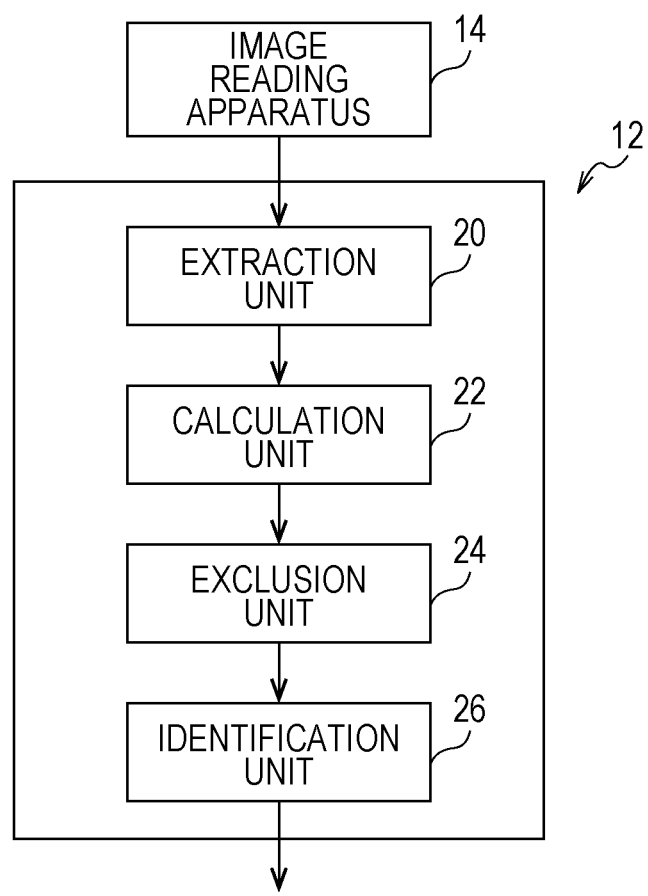
FIG. 3 is a block diagram illustrating functions of an image identification apparatus according to a first exemplary embodiment.

Next, a description will be given of a configuration of an image identification system according to this exemplary embodiment and functions of the image identification apparatus. FIG. 2 is a block diagram illustrating a configuration of an image identification system 10 according to this exemplary embodiment. FIG. 3 is a block diagram illustrating functions of an image identification apparatus 12 according to this exemplary embodiment.

As depicted in FIG. 2, the image identification system 10 includes the image identification apparatus 12 and an image reading apparatus 14. The image reading apparatus 14 is a scanner, reads a drawing drawn on the sheet P, generates color or monochrome image data, and outputs the generated image data to the image identification apparatus 12. As depicted in FIG. 3, the image identification apparatus 12 includes an extraction unit 20, a calculation unit 22, an exclusion unit 24, and an identification unit 26.

The image identification apparatus 12 according to this exemplary embodiment is implemented under control of a central processing unit (CPU) that manages operation of the entire apparatus. Specifically, the image identification apparatus 12 has the CPU and a storage unit that includes a read-only memory (ROM) in which various programs, various parameters, and the like have been stored in advance, a random access memory (RAM) used as a work area during execution of various programs by the CPU, and a nonvolatile memory such as a flash memory. In addition, the image identification apparatus 12 includes a communication line interface (I/F) unit via which communication information is transmitted to or received from external devices. The image identification apparatus 12 further includes an operation display that receives an instruction from a user to the image identification apparatus 12 and that informs the user of various information relating to operation status and the like of the image identification apparatus 12. The operation display includes, for example, buttons that are displayed by program execution and by which operation instructions are received, a display of a touch panel type on which various information is displayed, and hardware keys such as a numerical keypad and a start button.

The extraction unit 20, which is an example of an extraction unit, receives image data from the image reading apparatus 14 and obtains a read image (hereinafter simply referred to as an image) represented by the image data that has been input. In this exemplary embodiment, a description will be given of a case where the extraction unit 20 receives image data from the image reading apparatus 14 by way of a non-restrictive example, but image data may be received from an external device via the communication line I/F unit.

The extraction unit 20 extracts from the obtained image multiple lines included in the image. In this exemplary embodiment, to avoid complications, a description will be given of a case where the sheet P on which drawings are drawn in black on a white background is read as monochrome image data.

In this exemplary embodiment, the extraction unit 20 extracts regions (hereinafter referred to as objects) where pixels of the same color as the color of the boundary 30 delimiting the entire area of the image (black in this exemplary embodiment) are aligned continuously as candidate lines and then selects lines from the extracted objects, thereby extracting multiple lines from the image. Specifically, the extraction unit 20 first extracts multiple objects included in the image. The extraction unit 20 also determines whether each of the extracted objects is constituted by at least one line in accordance with the shape of the extracted object. Then, the extraction unit 20 selects objects that have been determined to be constituted by at least one line from the multiple objects and thereby extracts multiple lines from the image.

In this exemplary embodiment, if a predetermined number (for example, five), or more, black pixels are aligned continuously in at least one of a predetermined first direction (for example, the X direction) along a side of the image and a second direction that intersects the first direction (for example, the Y direction), the group of the black pixels aligned continuously is determined to be an object.

The calculation unit 22 is an example of a first calculation unit, a second calculation unit, and an identification unit, selects the boundary 30 delimiting the entire area of the image from multiple lines extracted by the extraction unit 20, and calculates coordinates of the boundary 30 delimiting the entire area of the image.

If the boundary 30 delimiting the entire area of the image is an image frame that is rectangular or substantially rectangular in shape, the boundary 30 delimiting the entire area of the image is likely to be drawn along the periphery of the sheet P. Therefore, an object corresponding to the boundary 30 delimiting the entire area of the image is expected to have a sufficiently large number of black pixels aligned continuously (length) compared with other objects. As illustrated in this exemplary embodiment, if the boundary 30 delimiting the entire area of the image is an image frame that is rectangular or substantially rectangular in shape, the boundary 30 delimiting the entire area of the image is expected to have a shape that is sufficiently elongated both in the X direction and in the Y direction.

Then, in this exemplary embodiment, the largest object among the objects that have been determined to be constituted by at least one line is selected as the boundary 30 delimiting the entire area of the image. The largest object is an object that is determined to be constituted by at least one line and that is enclosed by the smallest rectangular or substantially rectangular region whose size is largest.

Specifically, for each object determined to be constituted by at least one line, the calculation unit 22 determines the smallest rectangular or substantially rectangular frame that encloses the object and calculates a length in the X direction and a length in the Y direction of the frame thus determined. Next, the calculation unit 22 selects an object that is enclosed by a rectangular or substantially rectangular frame whose lengths in the X direction and the Y direction are both longest among the objects determined to be constituted by at least one line. Then, the calculation unit 22 regards the selected object as the boundary 30 delimiting the entire area of the image and calculates coordinates of the boundary 30 delimiting the entire area of the image.

In this exemplary embodiment, considering that the boundary 30 delimiting the entire area of the image is an image frame that is rectangular or substantially rectangular in shape, the coordinates of the boundary 30 delimiting the entire area of the image are represented by a range of coordinates in the X direction and a range of coordinates in the Y direction. In the example depicted in FIG. 1, the ranges of the coordinates (x, y) of the boundary 30 delimiting the entire area of the image are given as follows. For the upper line when viewed from the front, the range of X coordinates is given by $x1 \leq x \leq x4$, and the range of Y coordinates is given by $y1 \leq y \leq y2$. For the lower line when viewed from the front, the range of X coordinates is given by $x1 \leq x \leq x4$, and the range of Y coordinates is given by $y3 \leq y \leq y4$. For the left line when viewed from the front, the range of X coordinates is given by $x1 \leq x \leq x2$, and the range of Y coordinates is given by $y1 \leq y \leq y4$. For the right line when viewed from the front, the range of X coordinates is given by $x3 \leq x \leq x4$, and the range of Y coordinates is given by $y1 \leq y \leq y4$.

The coordinate $x1$ is the X coordinate of the left end of the left line of the boundary 30 delimiting the entire area of the image, and the coordinate $x2$ is the X coordinate of the right end of the left line of the boundary 30 delimiting the entire area of the image. The coordinate $x3$ is the X coordinate of the left end of the right line of the boundary 30 delimiting the entire area of the image, and the coordinate $x4$ is the X coordinate of the right end of the right line of the boundary 30 delimiting the entire area of the image. The coordinate $y1$ is the Y coordinate of the upper end of the upper line of the boundary 30 delimiting the entire area of the image, and the coordinate $y2$ is the Y coordinate of the lower end of the upper line of the boundary 30 delimiting the entire area of the image. The coordinate $y3$ is the Y coordinate of the upper end of the lower line of the boundary 30 delimiting the entire area of the image, and the coordinate $y4$ is the Y coordinate of the lower end of the lower line of the boundary 30 delimiting the entire area of the image.

In this exemplary embodiment, the calculation unit 22 determines that there is no boundary 30 delimiting the entire area of the image if there is no object that has the longest length in the X direction and the longest length in the Y direction among the objects that have been determined to be constituted by at least one line. If there is no boundary 30 delimiting the entire area of the image, the calculation unit 22 need not calculate the coordinates of the boundary 30 delimiting the entire area of the image because the boundary 30 delimiting the entire area of the image need not be excluded by the exclusion unit 24.

As described above, if the boundary 30 delimiting the entire area of the image is an image frame that is rectangular or substantially rectangular in shape, the boundary 30 delimiting the entire area of the image is likely to be drawn along the periphery of the sheet P. Thus, an object corresponding to the boundary 30 delimiting the entire area of the image is often formed in a peripheral region of the sheet P. The peripheral region mentioned here refers to, for example, a region that is within a predetermined threshold (for example, 30% of the length of the sheet P in the X direction) from both ends of the sheet P in the X direction and within a predetermined threshold (for example, 30% of the length of the sheet P in the Y direction) from both ends of the sheet P in the Y direction.

Then, the calculation unit 22 may select as the boundary 30 delimiting the entire area of the image, an object whose length in the X direction and length in the Y direction are longest among the objects determined to be constituted by at least one line and whose length in the X direction and length in the Y direction are respectively longer than a threshold based on the length of the sheet P in the X direction and a threshold based on the length of the sheet P in the Y direction. Alternatively, only if the largest object among the objects determined to be constituted by at least one line is located in a predetermined peripheral region, the calculation unit 22 may select the largest object as the boundary 30 delimiting the entire area of the image.

Here, the threshold based on the length of the sheet P in the X direction indicates, for example, the length of the sheet P in the X direction multiplied by a predetermined ratio (for example, 80%). The threshold based on the length of the sheet P in the Y direction indicates the length of the sheet P in the Y direction multiplied by a predetermined ratio (for example, 80%). These thresholds may also be called requirements based on the size of the sheet P (first thresholds).

These thresholds are examples to illustrate a case where the boundary 30 delimiting the entire area of the image is an image frame that is rectangular or substantially rectangular in shape. If the boundary 30 delimiting the entire area of the image has a different shape such as a circular shape, a threshold that suits the shape is selected.

The calculation unit 22 may determine that the boundary 30 delimiting the entire area of the image is absent if the largest object among the objects determined to be constituted by at least one line does not meet the requirements based on the size of the sheet P. In this case, the calculation unit 22 need not calculate the coordinates of the boundary 30 delimiting the entire area of the image, either.

A line drawn on the sheet P may not be recognized as a line in a read image when the extraction unit 20 extracts multiple lines from the image. An example of such a case will be described. The sheet P from which the image reading apparatus 14 reads an image varies in thickness, size, and the like. In particular, the size of a drawing used in a manufacturing plant sometimes exceeds the size 4A0, which is approximately 64 times the size A4. For example, when an image drawn on a large thin sheet, which is placed on a document platen, is read, as illustrated in FIG. 4A, for example, a straight line 40 included in an image drawn on the sheet P may be recognized as three separate line segments denoted by 40A, 40B, and 40C, which constitute part of a wavy form, affected by bending or deflection of the sheet P.

Figure 4A:
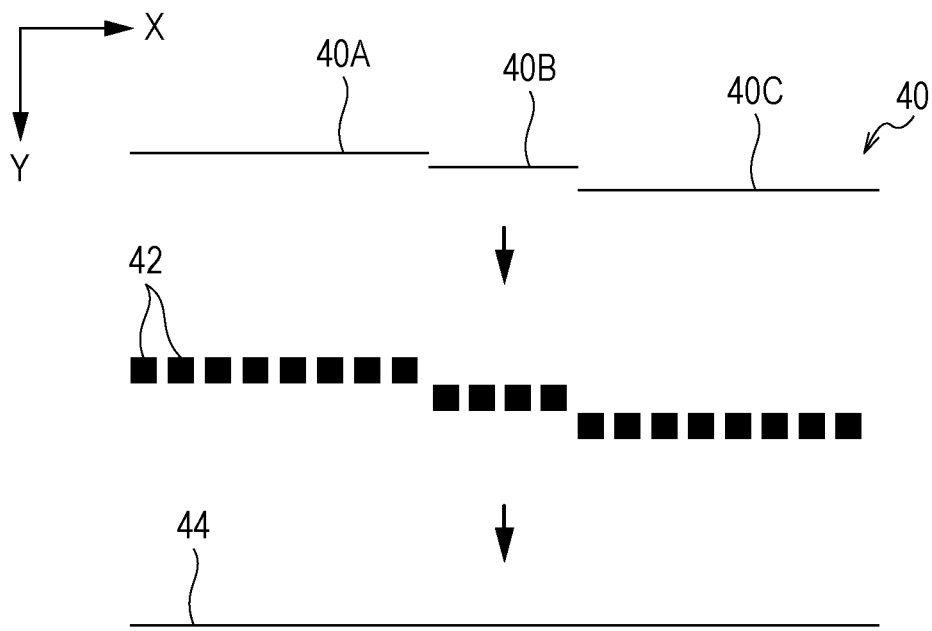
FIG. 4A is a schematic diagram illustrating an example of a correction method for a wavy line included in an image to be identified by the image identification apparatus according to the exemplary embodiments.

As illustrated in FIG. 4A, for example, although the straight line 40 extending in the X direction is drawn on the sheet P, black pixels 42 that correspond to the straight line 40 are sometimes not aligned but separated in the Y direction in a read image. In such a case, the aforementioned extraction method performed by the extraction unit 20 extracts the straight line 40 as objects 40A, 40B, and 40C, each of which is determined to be a line segment. As a result, the straight line 40, which is in fact part of the boundary 30 delimiting the entire area of the image, may not be recognized as part of the boundary 30 delimiting the entire area of the image because the objects 40A, 40B, and 40C, each of which is determined to be a line segment, do not meet the requirements based on the size of the sheet P.

Thus, if the multiple line segments 40A, 40B, and 40C, each of which extends in a predetermined direction (for example, the X direction) and has a length longer than or equal to a predetermined value (for example, three pixels), are aligned continuously in the X direction and aligned continuously in another direction that intersects the X direction (for example, the Y direction), the calculation unit 22 regards these multiple line segments as a single line 44. Alternatively, if the multiple line segments 40A, 40B, and 40C, each of which extends in a predetermined direction (for example, the X direction) and has a length longer than or equal to a predetermined value (for example, three pixels), overlap each other in a certain portion in the X direction and are aligned continuously in another direction that intersects the X direction (for example, the Y direction), the calculation unit 22 regards these multiple line segments as a single line 44.

Here, if a region corresponding to a line segment in a predetermined direction (for example, the X direction) and a region corresponding to another line segment in the predetermined direction (for example, the X direction) are adjacent to each other in the X direction, these two line segments are referred to as being aligned continuously. However, the definition of "aligned continuously" is not limited to the above case, and if a region corresponding to a line segment in a predetermined direction (for example, the X direction) and a region corresponding to another line segment in the predetermined direction (for example, the X direction) are separated by a gap within a predetermined error range (for example, two pixels) in the X direction, these two line segments may be referred to as being aligned continuously.

Next, the calculation unit 22 regards a line extracted by the extraction unit 20 as the boundary 30 delimiting the entire area of the image if the length of the line 44 in the X direction meets the aforementioned requirements based on the size of the sheet P. Then, the calculation unit 22 calculates coordinates of the boundary 30 delimiting the entire area of the image. In the calculation, the range of the coordinate of the line 44 in the X direction may be set to a range of coordinates in the X direction of the smallest region that is rectangular or substantially rectangular in shape and includes all of the line segments 40A, 40B, and 40C. The coordinate of the line 44 in the Y direction may be set to a value in a range of coordinates in the Y direction of the smallest region that is rectangular or substantially rectangular in shape and includes all of the line segments 40A, 40B, and 40C, or may be set to, for example, an average value of the both ends of the range thus determined. In addition, the thickness of the line 44 may be set to the range of the coordinates in the Y direction of the smallest region that is rectangular or substantially rectangular in shape and includes all of the line segments 40A, 40B, and 40C, or may be set to, for example, an average thickness of the line segments 40A, 40B, and 40C.

Figure 4B:
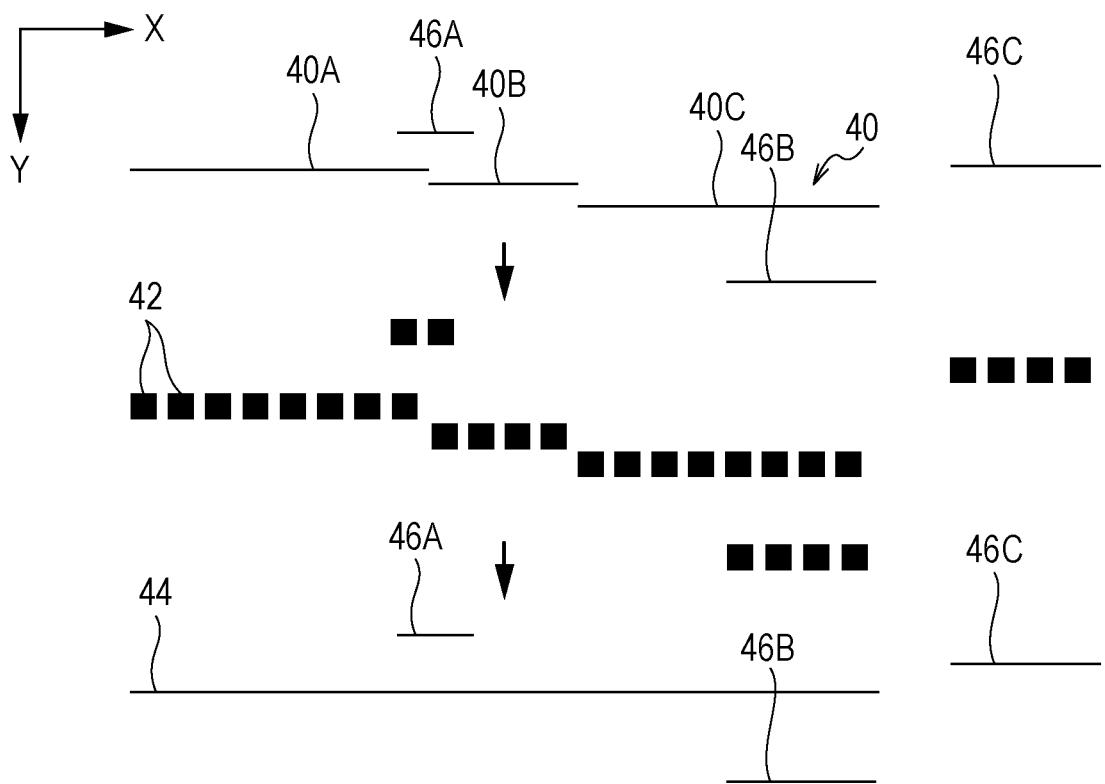
FIG. 4B is a schematic diagram illustrating an example of a correction method for a wavy line included in an image to be identified by the image identification apparatus according to the exemplary embodiments.

As illustrated in FIG. 4B, for example, a line segment 46A, which does not have a length longer than or equal to a threshold length (for example, three pixels) in the X direction, is not included in the line 44.

In addition, a line segment 46B, which has a length longer than or equal to the threshold length (for example, three pixels) in the X direction and overlaps the line segment 40C in a portion in the X direction, but is not aligned continuously with none of the other line segments 40A, 40B, and 40C in the Y direction, is not included in the line 44.

Further, a line segment 46C, which has a length longer than or equal to the threshold length (for example, three pixels) but is not aligned with none of the other line segments 40A, 40B, and 40C in the X direction, is not included in the line 44.

However, if two line segments extending in the X direction are not strictly aligned continuously with each other and do not overlap each other in any portion in the X direction, the two line segments may be regarded as a single line provided that the two line segments are separated in the X direction with a gap within a predetermined error range (for example, two pixels).

Figure 5A:
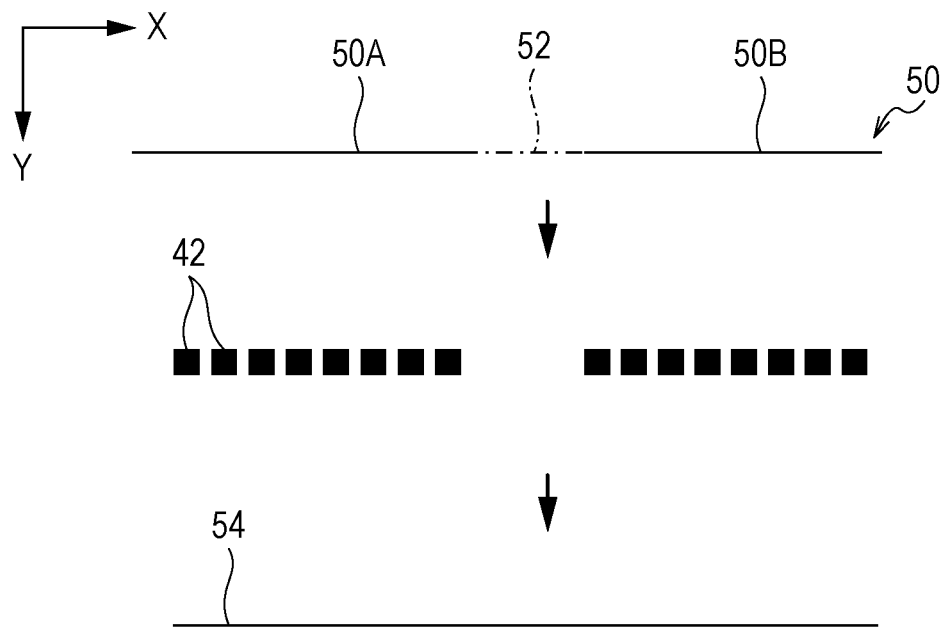
FIG. 5A is a schematic diagram illustrating an example of a correction method for a discontinuous line included in an image to be identified by the image identification apparatus according to the exemplary embodiments.

Next, a description will be given of another example where a line drawn on the sheet P is not recognized as a line in a read image when the extraction unit 20 extracts lines from the image. When the image reading apparatus 14 reads an image drawn on the sheet P, a line drawn on the sheet P is sometimes discontinuous at a portion depending on a reading condition, image conversion, or the like. Specifically, as illustrated in FIG. 5A, for example, a line 50 extending in the X direction drawn on the sheet P may be discontinuous at a portion and split into multiple line segments 50A and 50B in a read image.

In this exemplary embodiment, a length (the number of white pixels) of a discontinuous portion or a gap 52 in the X direction is compared with the lengths (the numbers of black pixels) of the line segments 50A and 50B in the X direction, between which the gap 52 is interposed. For example, if the length of the gap 52 in the X direction and a sum of the lengths of the line segments 50A and 50B, between which the gap 52 is interposed, satisfy a predetermined requirements, the calculation unit 22 regards the line segments 50A and 50B as a single line 54 and calculates the coordinates of the boundary 30 delimiting the entire area of the image.

Here, the predetermined requirements may be, for example, the length of the gap 52 in the X direction being less than or equal to a predetermined threshold (for example, 1% of the length of the sheet P in the X direction) and a sum of the length of the gap 52 in the X direction and the lengths of the line segments 50A and 50B in the X direction being longer than or equal to the length of the sheet P in the X direction multiplied by a predetermined ratio (a third threshold, for example, 80% of the length of the sheet P in the X direction). Here, a description has been given of a case where a single gap 52 is present in the line 50, but similar requirements will be applied to a case where multiple gaps 52 are present.

Figure 5B:
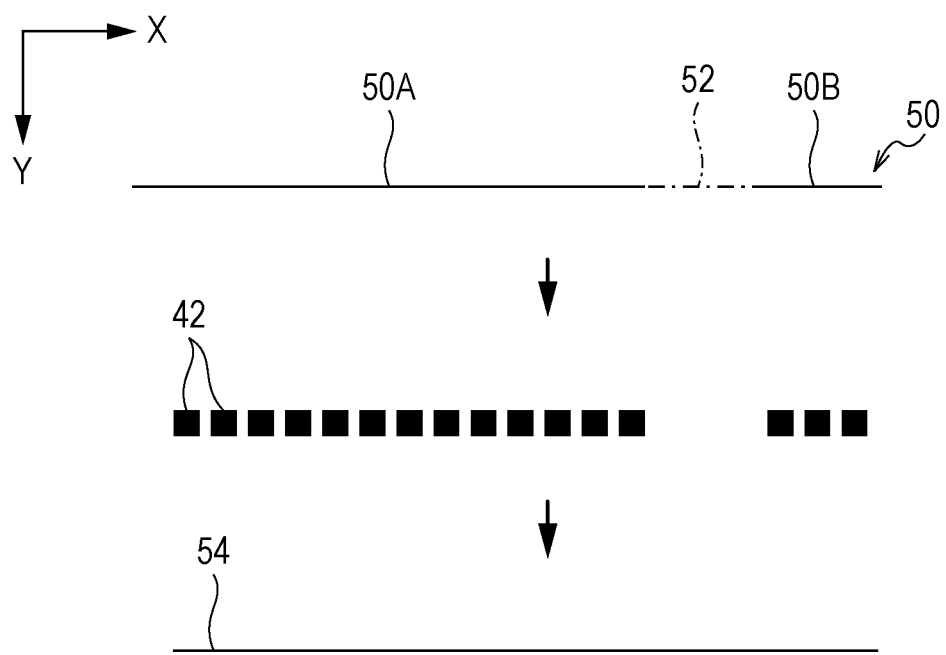
FIG. 5B is a schematic diagram illustrating an example of a correction method for a discontinuous line included in an image to be identified by the image identification apparatus according to the exemplary embodiments.

As illustrated in FIG. 5B, for example, in a case where the line segment 50A is longer than the other line segment 50B, if the length of the gap 52 in the X direction and the sum of the lengths of the line segments 50A and 50B in the X direction satisfy the predetermined requirements described above, these line segments 50A and 50B are regarded as a single line 54, and coordinates of the boundary 30 delimiting the entire area of the image are calculated.

Figure 5C:
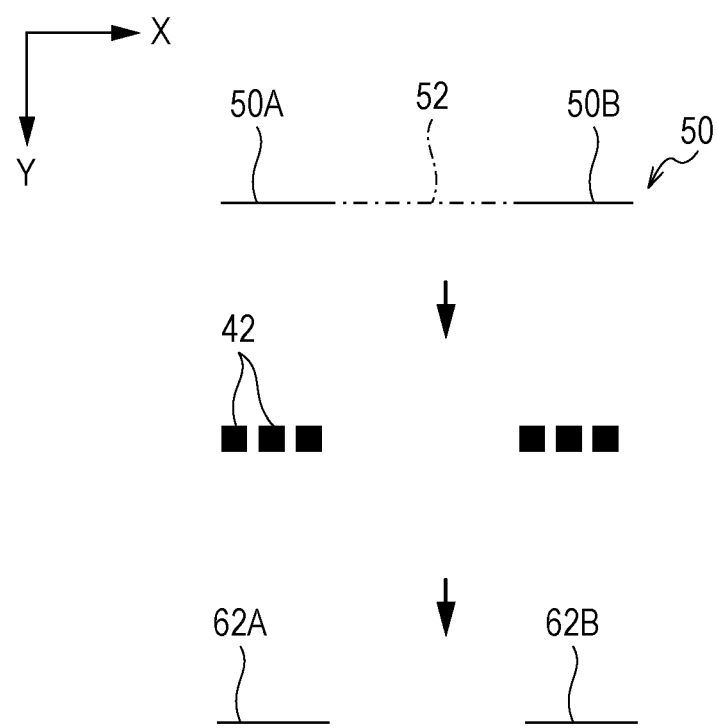
FIG. 5C is a schematic diagram illustrating an example of a correction method for a discontinuous line included in an image to be identified by the image identification apparatus according to the exemplary embodiments.

However, as illustrated in FIG. 5C, for example, if the sum of the lengths of the line segments 50A and 50B in the X direction is shorter than the length of the gap 52 in the X direction and the length of the gap 52 and the sum of the lengths of the line segments 50A and 50B in the X direction do not satisfy the predetermined requirements described above, these two line segments 50A and 50B are not regarded as a single line, but regarded as separate line segments 62A and 62B.

Figure 6A:
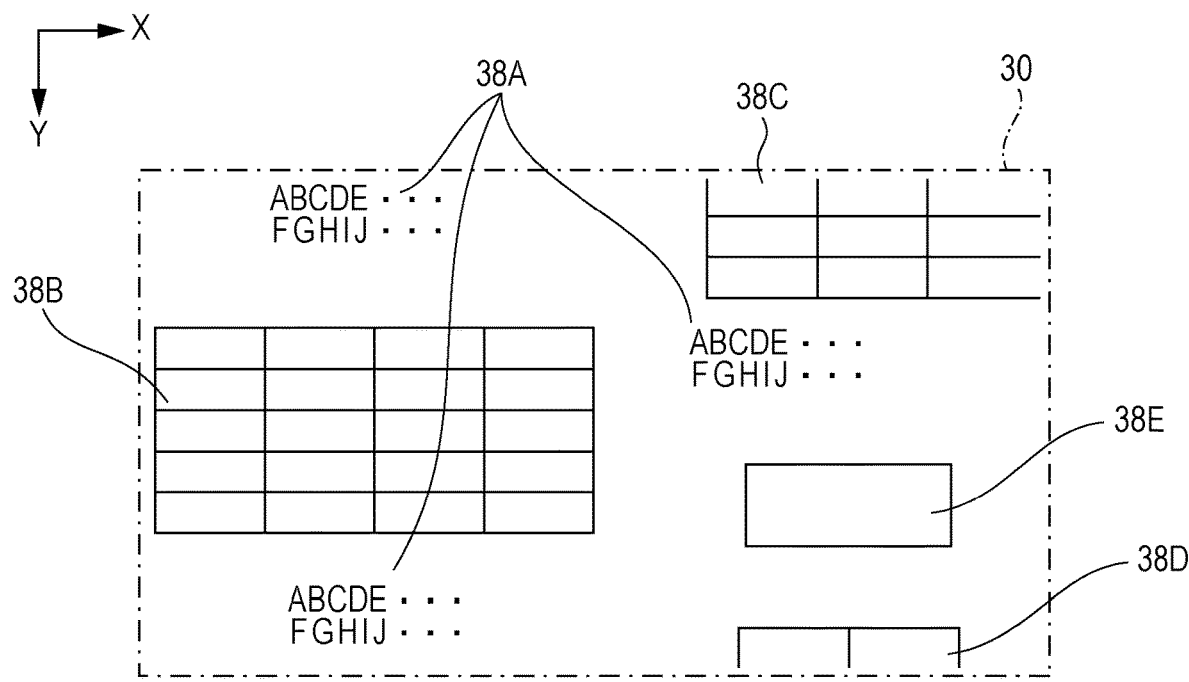
FIG. 6A depicts a front view of an example of an image identified by the image identification apparatus according to the first exemplary embodiment.
Figure 6B:
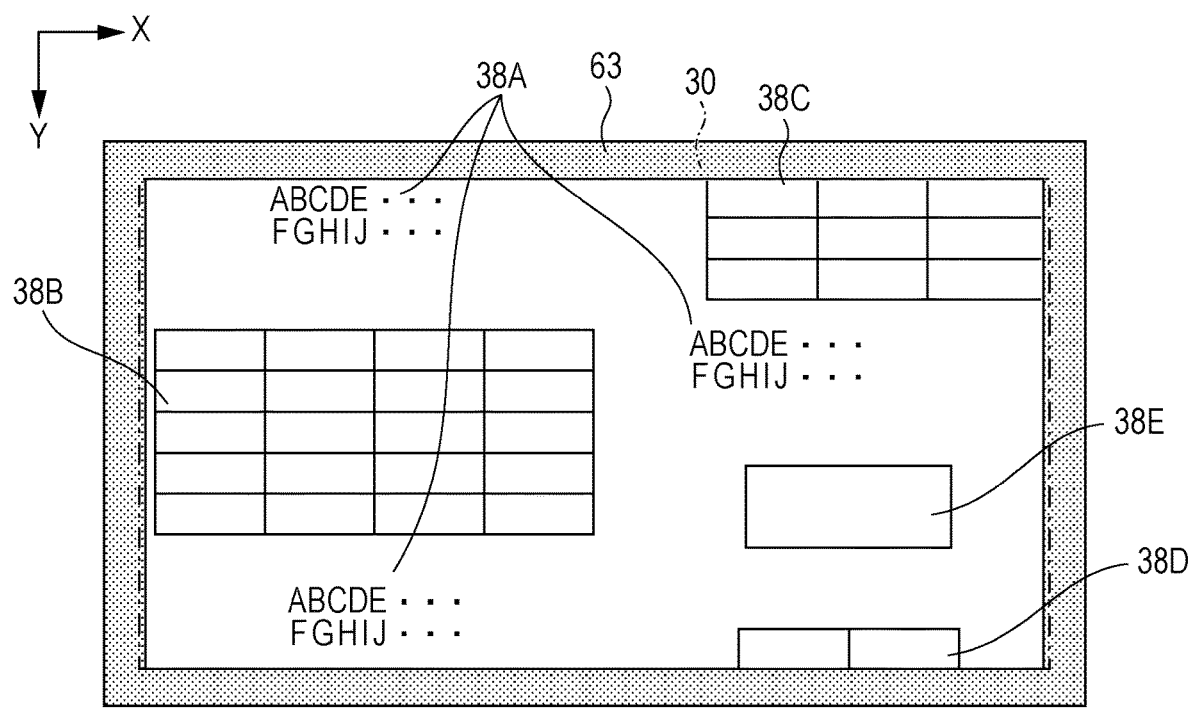
FIG. 6B depicts a front view of another example of an image identified by the image identification apparatus according to the first exemplary embodiment.

The exclusion unit 24, which is an example of an exclusion unit, excludes the boundary 30 delimiting the entire area of the image from objects to be identified in the image by the identification unit 26 in accordance with the coordinates calculated by the calculation unit 22. As illustrated in FIG. 6A, for example, the exclusion unit 24 may exclude only the boundary 30 delimiting the entire area of the image. Alternatively, as illustrated in FIG. 6B, for example, the exclusion unit 24 may exclude a region 63 (a shaded region in FIG. 6B) that is located outside the boundary 30 delimiting the entire area of the image. The region 63 also includes the boundary 30 delimiting the entire area of the image.

If multiple lines that are among the lines extracted by the extraction unit 20 and that are not excluded by the exclusion unit 24 are connected to each other, the identification unit 26, which is an example of an identification unit, identifies the multiple lines that are connected to each other as a single object.

As illustrated in FIGS. 6A and 6B, for example, objects 38A that correspond to the character regions 32, objects 38B, 38C, and 38D that correspond to the table regions 34A, 34B, and 34C, respectively, and an object 38E that corresponds to the picture region 36 are identified under a condition that the boundary 30 delimiting the entire area of the image is removed. More specifically, the objects 38C and 38D that respectively correspond to the table regions 34B and 34C that are in contact with the boundary 30 delimiting the entire area of the image are identified under a condition that lines overlapping the boundary 30 delimiting the entire area of the image are removed. In contrast, the objects 38A, 38B, and 38E that correspond respectively to the character regions 32, the table region 34A, and the picture region 36 that are separated from the boundary 30 delimiting the entire area of the image are identified without modification.

Next, referring to a flowchart in FIG. 7, a flow of an image identification process that the image identification apparatus 12 according to this exemplary embodiment performs upon receiving a predetermined execution instruction will be described. In this exemplary embodiment, it is assumed that a program for the image identification process is stored in the storage unit in advance, but this should not be construed as limiting. For example, the program for the image identification process may be received from an external apparatus via the communication line I/F unit and stored in the storage unit. Alternatively, the program for the image identification process may be recorded in a recording medium such as a CD-ROM and read via a device such as a CD-ROM drive, and the image identification process may be performed.

In step S101, the extraction unit 20 receives image data from the image reading apparatus 14 and obtains the image data.

In step S103, the extraction unit 20 extracts multiple lines from an image provided by the image data.

In step S105, the calculation unit 22 selects a boundary delimiting the entire area of the image from the multiple lines that have been extracted and calculates coordinates of the selected boundary delimiting the entire area of the image.

In step S107, the exclusion unit 24 excludes the boundary 30 delimiting the entire area of the image from objects to be identified in the image in accordance with the calculated coordinates of the boundary 30 delimiting the entire area of the image.

In step S109, if multiple lines that are among the lines extracted by the extraction unit 20 and that are not excluded by the exclusion unit 24 are connected to each other, the identification unit 26 identifies the multiple lines that are connected to each other as a single object.

In step S111, the identification unit 26 causes the storage unit to store, as identification information, information about the objects that have been identified.

In step S113, the extraction unit 20 determines whether subsequent image data is present. If it is determined that subsequent image data is present in step S113 (Y in S113), the process proceeds to step S101 and performs steps S101 to S113 on the subsequent image data. If it is determined that subsequent image data is absent (N in S113), the process completes the execution of the program for the image identification process.

Thus, in this exemplary embodiment, multiple lines are extracted from an image, and a boundary 30 delimiting the entire area of the image among the extracted lines is excluded from the objects to be identified. Then, if multiple lines that are among the extracted lines and that are not excluded are connected to each other, the multiple lines that are connected to each other are identified as a single object.

In this exemplary embodiment, a case where the boundary 30 delimiting the entire area of the image is an image frame that is rectangular or substantially rectangular in shape has been described. However, if the shape of the boundary 30 delimiting the entire area of the image is a long line, the calculation unit 22 selects an object that is longest in a predetermined direction (for example, the X direction or the Y direction) from objects determined to be constituted by at least one line.

Further, the calculation unit 22 may select as the boundary 30 delimiting the entire area of the image, an object whose length in either the X direction or the Y direction is longest among the objects determined to be constituted by at least one line and whose length in either the X direction or the Y direction is longer than a threshold (a second threshold) based on the length of the sheet P in the corresponding one of the X and Y directions. Here, the threshold based on the length of the sheet P in the X direction or the Y direction indicates, for example, the length of the sheet P in the X direction or the Y direction multiplied by a predetermined ratio (for example, 80%).

Second Exemplary Embodiment

Next, an image identification apparatus according to a second exemplary embodiment will be described.

In the first exemplary embodiment described above, the case where all of the boundary 30 delimiting the entire area of the image is excluded has been described. In contrast, in the second exemplary embodiment, a case where a portion of the boundary 30 delimiting the entire area of the image is excluded will be described. The portion to be excluded is located in a region that is not included in a region that overlaps a table region.

Figure 8:
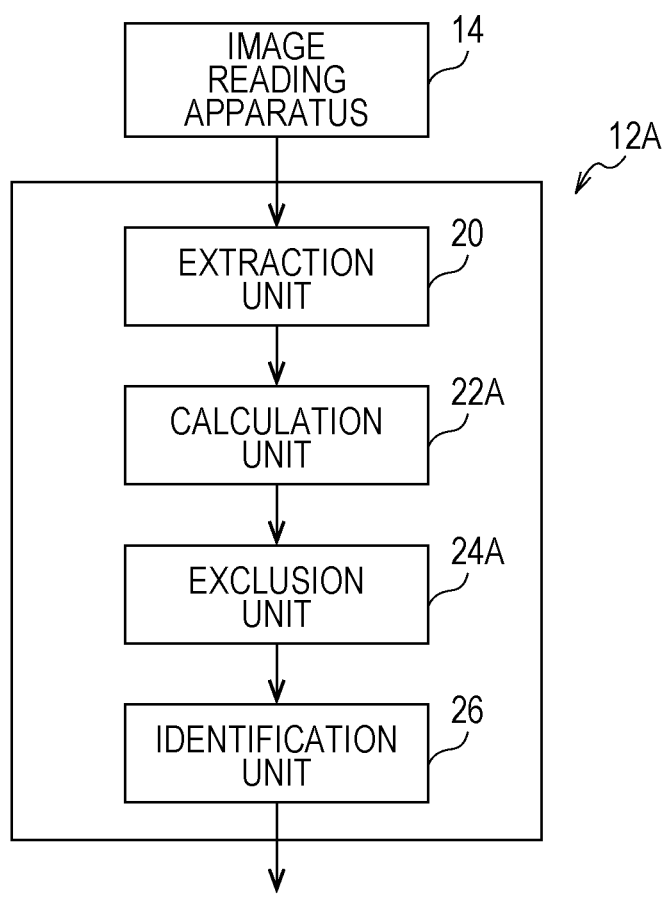
FIG. 8 is a block diagram illustrating functions of an image identification apparatus according to a second exemplary embodiment.

As depicted in FIG. 8, a configuration of the image identification apparatus according to the second exemplary embodiment is the same as the image identification apparatus 12 according to the first exemplary embodiment described above except that the calculation unit 22 is replaced by a calculation unit 22A and the exclusion unit 24 is replaced by an exclusion unit 24A, and descriptions of constituents other than the calculation unit 22A and the exclusion unit 24A will be omitted.

The calculation unit 22A selects a boundary 30 delimiting the entire area of the image from objects that are extracted by the extraction unit 20 and determined to be constituted by at least one line and calculates coordinates of the boundary 30 delimiting the entire area of the image in a similar manner used by the calculation unit 22 in the first exemplary embodiment.

The calculation unit 22A also selects a table region from the objects that are extracted by the extraction unit 20 and determined to be constituted by at least one line and that are not the boundary 30 delimiting the entire area of the image. Then, the calculation unit 22A calculates coordinates of the table region.

As illustrated in FIG. 9A, for example, suppose that multiple line segments 70A, 70B, 70C, and 70D drawn in parallel or substantially parallel to each other in a predetermined direction (for example, the X direction) intersect multiple line segments 72A, 72B, 72C, and 72D drawn in parallel or substantially parallel to each other in a direction that intersects the X direction (for example, the Y direction). In this case, the calculation unit 22A regards these multiple line segments 70A, 70B, 70C, 70D, 72A, 72B, 72C, and 72D as ruled lines in a table, extracts a rectangular or substantially rectangular region (a shaded region in FIG. 9A) enclosed by the ruled lines as a table region 64, and calculates coordinate ranges of the table region 64.

In the example depicted in FIG. 9A, the line segments that extend in the X direction and are in contact with or touch the boundary 30 delimiting the entire area of the image are the line segments 70A, 70B, 70C, and 70D. From top to bottom when viewed from the front, the range of Y coordinates of the line segment 70A is given by $y11 \leq y \leq y12$, the range of Y coordinates of the line segment 70B is given by $y13 \leq y \leq y14$, the range of Y coordinates of the line segment 70C is given by $y15 \leq y \leq y16$, and the range of Y coordinates of the line segment 70D is given by $y17 \leq y \leq y18$. Thus, a portion of the boundary 30 delimiting the entire area of the image overlaps the table region 64, and the range of Y coordinates of the overlapping portion is given by $y11 \leq y \leq y18$.

The coordinate $y11$ is the Y coordinate of the upper end of the line segment 70A, and the coordinate $y12$ is the Y coordinate of the lower end of the line segment 70A. The coordinate $y13$ is the Y coordinate of the upper end of the line segment 70B, and the coordinate $y14$ is the Y coordinate of the lower end of the line segment 70B. The coordinate $y15$ is the Y coordinate of the upper end of the line segment 70C, and the coordinate $y16$ is the Y coordinate of the lower end of the line segment 70C. The coordinate $y17$ is the Y coordinate of the upper end of the line segment 70D, and the coordinate $y18$ is the Y coordinate of the lower end of the line segment 70D.

In the example depicted in FIG. 9A, the line segments that extend in the Y direction and are in contact with or touch the boundary 30 delimiting the entire area of the image are the line segments 72A, 72B, 72C, and 72D. From left to right when viewed from the front, the X coordinate ranges of the line segments 72A, 72B, 72C, and 72D that are in contact with or touch the boundary 30 delimiting the entire area of the image are respectively given by $x11 \leq x \leq x12$, $x13 \leq x \leq x14$, $x15 \leq x \leq x16$, $x17 \leq x \leq x18$. Thus, a portion of the boundary 30 delimiting the entire area of the image overlaps the table region 64, and the range of X coordinates of the overlapping portion is given by $x11 \leq y \leq x18$.

The coordinate $x11$ is the X coordinate of the left end of the line segment 72A, and the coordinate $x12$ is the X coordinate of the right end of the line segment 72A. The coordinate $x13$ is the X coordinate of the left end of the line segment 72B, and the coordinate $x14$ is the X coordinate of the right end of the line segment 72B. The coordinate $x15$ is the X coordinate of the left end of the line segment 72C, and the coordinate $x16$ is the X coordinate of the right end of the line segment 72C. The coordinate $x17$ is the X coordinate of the left end of the line segment 72D, and the coordinate $x18$ is the X coordinate of the right end of the line segment 72D.

Then, the calculation unit 22A separates a region that overlaps a table region from the region corresponding to the boundary 30 delimiting the entire area of the image and calculates coordinate ranges of a region that corresponds to the boundary 30 delimiting the entire area of the image and that does not overlap the table region.

Figure 9B:
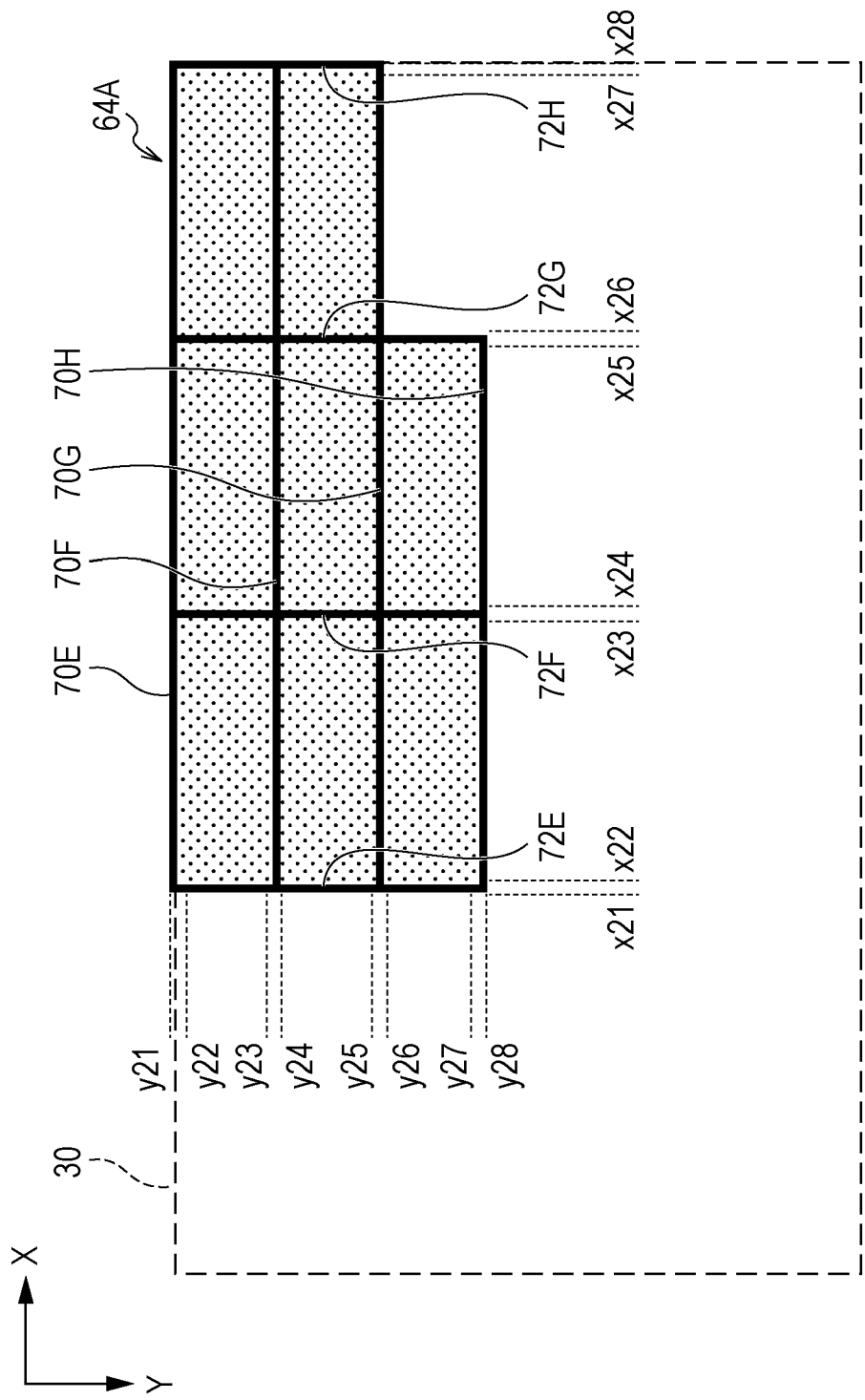
FIG. 9B is a schematic diagram illustrating another example of the identification method of a table by the image identification apparatus according to the second exemplary embodiment.

However, a table region is not limited to being rectangular or substantially rectangular in shape as illustrated by the table region 64 depicted in FIG. 9A. As illustrated in FIG. 9B, for example, a table region 64A includes line segments 70E, 70F, and 70G that extend in the X direction and that are in contact with or touch the boundary 30 delimiting the entire area of the image and a line segment 70H that does not touch the boundary 30 delimiting the entire area of the image. The calculation unit 22A calculates coordinate ranges of the line segments 70E, 70F, and 70G that extend in the X direction and are in contact with or touch the boundary 30 delimiting the entire area of the image.

In the example depicted in FIG. 9B, from top to bottom when viewed from the front, the range of Y coordinates of the line segment 70E is given by $y21 \leq y \leq y22$, the range of Y coordinates of the line segment 70F is given by $y23 \leq y \leq y24$, and the range of Y coordinates of the line segment 70G is given by $y25 \leq y \leq y26$. Thus, a portion of the boundary 30 delimiting the entire area of the image overlaps the table region 64A, and the range of Y coordinates of the overlapping portion is given by $y21 \leq y \leq y26$.

The coordinate $y21$ is the Y coordinate of the upper end of the line segment 70E, and the coordinate $y22$ is the Y coordinate of the lower end of the line segment 70E. The coordinate $y23$ is the Y coordinate of the upper end of the line segment 70F, and the coordinate $y24$ is the Y coordinate of the lower end of the line segment 70F. The coordinate $y25$ is the Y coordinate of the upper end of the line segment 70G, and the coordinate $y26$ is the Y coordinate of the lower end of the line segment 70G. The coordinate $y27$ is the Y coordinate of the upper end of the line segment 70H, and the coordinate $y28$ is the Y coordinate of the lower end of the line segment 70H.

In the example depicted in FIG. 9B, the line segments that extend in the Y direction and are in contact with or touch the boundary 30 delimiting the entire area of the image are line segments 72E, 72F, 72G, and 72H. From left to right when viewed from the front, the range of X coordinates of the line segment 72E is given by $x21 \leq x \leq x22$, the range of X coordinates of the line segment 72F is given by $x23 \leq x \leq x24$, the range of X coordinates of the line segment 72G is given by $x25 \leq x \leq x26$, and the range of X coordinates of the line segment 72H is given by $x27 \leq x \leq x28$. Thus, a portion of the boundary 30 delimiting the entire area of the image overlaps the table region 64A, and the range of X coordinates of the overlapping portion is given by $x21 \leq x \leq x28$.

The coordinate $x21$ is the X coordinate of the left end of the line segment 72E, and the coordinate $x22$ is the X coordinate of the right end of the line segment 72E. The coordinate $x23$ is the X coordinate of the left end of the line segment 72F, and the coordinate $x24$ is the X coordinate of the right end of the line segment 72F. The coordinate $x25$ is the X coordinate of the left end of the line segment 72G, and the coordinate $x26$ is the X coordinate of the right end of the line segment 72G. The coordinate $x27$ is the X coordinate of the left end of the line segment 72H, and the coordinate $x28$ is the X coordinate of the right end of the line segment 72H.

In accordance with the coordinates calculated by the calculation unit 22, the exclusion unit 24A excludes, from objects to be identified in the image by the identification unit 26, a region that corresponds to the boundary 30 delimiting the entire area of the image and that does not overlap the table region.

As illustrated in FIG. 10, for example, the exclusion unit 24A separates a region that is in contact with an object 76A corresponding to the table region 34B depicted in FIG. 1 and a region that is in contact with an object 76B corresponding to the table region 34C depicted in FIG. 1 from the region corresponding to the boundary 30 delimiting the entire area of the image. In addition, the exclusion unit 24A generates line segments 74 to be excluded, which are located in a region that is separated from the objects 76A and 76B in the region corresponding to the boundary 30 delimiting the entire area of the image.

Consequently, as illustrated in FIG. 11, for example, objects 39A that correspond to the character regions 32 depicted in FIG. 1, objects 39B, 39C, and 39D that correspond to the table regions 34A, 34B, and 34C depicted in FIG. 1, respectively, and an object 39E that corresponds to the picture region 36 depicted in FIG. 1 are identified without modification. Specifically, the objects 39C and 39D that correspond to the table regions 34B and 34C, respectively, overlap the boundary 30 delimiting the entire area of the image in the image but are identified with line segments thereof that overlap the boundary 30 delimiting the entire area of the image remaining. Similarly, the objects 39A, 39B, and 39E that correspond respectively to the character regions 32, the table region 34A, and the picture region 36 that are separated from the boundary 30 delimiting the entire area of the image are identified without modification. Thus, compared with the case where a table is analyzed with part thereof missing, as illustrated by the table regions 38C and 38D depicted in FIGS. 6A and 6B, correct analysis results are likely to be obtained if a table is analyzed with all of the ruled lines therein remaining, as illustrated by the table regions 39C and 39D.

Figure 12:
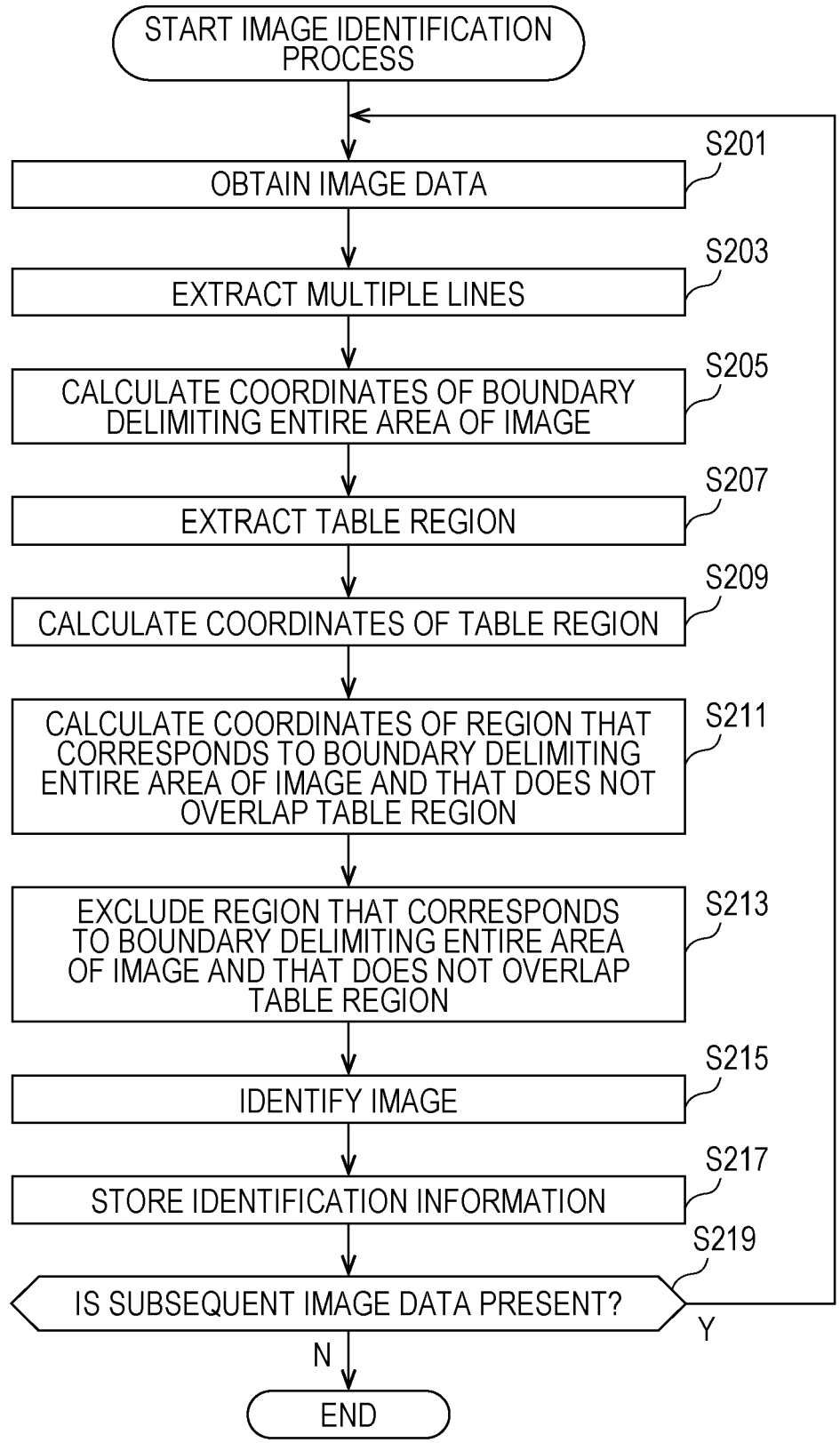
FIG. 12 is a flowchart illustrating an image identification process according to the second exemplary embodiment.

Next, referring to a flowchart in FIG. 12, a flow of an image identification process that the image identification apparatus 12 according to this exemplary embodiment performs upon receiving a predetermined execution instruction will be described. In this exemplary embodiment, it is assumed that a program for the image identification process is stored in the storage unit in advance, but this should not be construed as limiting. For example, the program for the image identification process may be received from an external apparatus via the communication line I/F unit and stored in the storage unit. Alternatively, the program for the image identification process may be recorded in a recording medium such as a CD-ROM and read via a device such as a CD-ROM drive, and the image identification process may be performed.

In step S201, the extraction unit 20 receives image data from the image reading apparatus 14 and obtains the image data.

In step S203, the extraction unit 20 extracts multiple lines from an image provided by the image data.

In step S205, the calculation unit 22A selects a boundary 30 delimiting the entire area of the image from the multiple lines that have been extracted and calculates coordinates of the boundary 30 delimiting the entire area of the image.

In step S207, the calculation unit 22A extracts a table region from the extracted multiple lines.

In step S209, the calculation unit 22A calculates coordinates of the table region.

In step S211, the calculation unit 22A calculates coordinates of a region that corresponds to the boundary 30 delimiting the entire area of the image and that does not overlap the table region.

In step S213, the exclusion unit 24A excludes, from objects to be identified in the image, the region that corresponds to the boundary 30 delimiting the entire area of the image and that does not overlap the table region in accordance with the coordinates of the region that corresponds to the boundary 30 delimiting the entire area of the image and that does not overlap the table region.

In step S215, if multiple lines that are among the lines extracted by the extraction unit 20 and that are not excluded by the exclusion unit 24 are connected to each other, the identification unit 26 identifies the multiple lines that are connected to each other as a single object.

In step S217, the identification unit 26 causes the storage unit to store, as identification information, information about the objects that have been identified.

In step S219, the extraction unit 20 determines whether subsequent image data is present. If it is determined that subsequent image data is present in step S219 (Y in S219), the process proceeds to step S201 and performs steps S201 to S219 on the subsequent image data. If it is determined that subsequent image data is absent (N in S219), the process completes the execution of the program for the image identification process.

In this way, lines are extracted from an image, and, among the regions corresponding to the extracted lines, the largest region that is included in the image and where black pixels are aligned continuously is determined to be the region corresponding to a boundary delimiting the entire area of the image. Next, a region that corresponds to the boundary delimiting the entire area of the image and that does not overlap a table region is excluded. Then, if multiple lines that are among the extracted lines and that are not excluded are connected to each other, the multiple lines that are connected to each other are identified as a single object.

According to this exemplary embodiment, when an image such as a drawing is analyzed, analyzing accuracy of elements in the drawing is improved by excluding a boundary 30 delimiting the entire area of the image. In addition, a table region displaying a title, a table region displaying alterations, and the like are separated from other drawing elements, and the analyzing accuracy of the elements in the drawing is improved. Further, because a portion shared by ruled lines in a table region and the boundary 30 delimiting the entire area of the image is not excluded, the table region is extracted accurately, thereby leading to a correct analysis result of a tabular arrangement.

In this exemplary embodiment, a description has been given of the case where the boundary 30 delimiting the entire area of the image is an image frame that is rectangular or substantially rectangular in shape and is represented by a range of coordinates in the X direction and a range of coordinates in the Y direction. Then, a region that corresponds to the boundary 30 delimiting the entire area of the image and that does not overlap a table region is obtained. However, if the boundary 30 delimiting the entire area of the image is a long line, a triangle, a polygon, or the like, the boundary 30 delimiting the entire area of the image is also represented by a range of coordinates in the X direction and a range of coordinates in the Y direction, and a region that corresponds to the boundary 30 delimiting the entire area of the image and that does not overlap a table region may be obtained.

Further, if the boundary 30 delimiting the entire area of the image is an image frame that is substantially circular, elliptical, or the like in shape, an object selected as the boundary 30 delimiting the entire area of the image may be approximated by creating an approximate curve, and a mathematical expression that represents the created approximate curve may be used to obtain a region that corresponds to the boundary 30 delimiting the entire area of the image and that does not overlap a table region.

Alternatively, if the boundary 30 delimiting the entire area of the image is an image frame that is a quadrilateral having rounded corners or the like in shape, the boundary 30 delimiting the entire area of the image may be separated into linear portions and curved portions, and a region that corresponds to the boundary 30 delimiting the entire area of the image and that does not overlap a table region may be obtained. For example, the linear portions may be represented by a range of coordinates in the X direction and a range of coordinates in the Y direction, the curved portions may be approximated by creating approximate curves, and mathematical expressions that represent the created approximate curves may be used to obtain a region that corresponds to the boundary 30 delimiting the entire area of the image and that does not overlap a table region.

The description has been given of the case where the boundary 30 delimiting the entire area of the image is not an image frame that is rectangular or substantially rectangular in shape. In every case, as described above for the process performed by the calculation unit 22, groups of black pixels aligned continuously are obtained, and a region for which a rectangular or substantially rectangular region that circumscribes one of the groups of black pixels is largest may be determined to be the boundary 30 delimiting the entire area of the image.

The configurations of the image identification apparatus 12 (refer to FIGS. 2 and 3) in the above exemplary embodiments are described by way of example. In other words, it should be understood that an unnecessary element may be removed or a new element may be added within the gist of the present invention.

The various process flows (refer to FIGS. 7 and 12) in the above exemplary embodiments are also described by way of example. In other words, it should be understood that an unnecessary step may be removed, a new step may be added, or a process order may be changed within the gist of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image identification apparatus comprising:
a processor programmed to:
extract lines from an image;
exclude from objects to be identified a boundary delimiting an entire area of the image among the extracted lines; and
identify as an object a plurality of lines that are among the extracted lines and that are not excluded from the objects to be identified if the plurality of lines are connected to each other.

2. The image identification apparatus according to claim 1, wherein the processor is further programmed to:
exclude, as a region that corresponds to the boundary delimiting the entire area of the image, a region that is largest among regions that are included in the image and in which pixels of the extracted lines are aligned continuously.

3. The image identification apparatus according to claim 1, wherein the processor is further programmed to:
exclude a portion of the boundary delimiting the entire area of the image, the portion being located in a region that is not included in a region that overlaps a table region extracted from the image.

4. The image identification apparatus according to claim 2, wherein the processor is further programmed to:
exclude a portion of the boundary delimiting the entire area of the image, the portion being located in a region that is not included in a region that overlaps a table region extracted from the image.

5. The image identification apparatus according to claim 1, wherein the processor is further programmed to:
exclude, as the boundary delimiting the entire area of the image, a line that is enclosed by a smallest substantially rectangular frame whose size is largest among smallest substantially rectangular frames by which the extracted lines are enclosed.

6. The image identification apparatus according to claim 5, wherein the processor is further programmed to:
exclude, as the boundary delimiting the entire area of the image, a line that is enclosed by a smallest substantially rectangular frame whose size is largest among the smallest substantially rectangular frames by which the extracted lines are enclosed, the smallest substantially rectangular frame being larger than or equal to a predetermined first threshold.

7. The image identification apparatus according to claim 6, wherein the predetermined first threshold is a threshold determined in accordance with a size of a recording medium if the image is a read image obtained by reading an image recorded on the recording medium.

8. The image identification apparatus according to claim 1, wherein the processor is further programmed to:
exclude, as the boundary delimiting the entire area of the image, a line whose length in a predetermined first direction is longest among lengths of the extracted lines.

9. The image identification apparatus according to claim 8, wherein the processor is further programmed to:
exclude, as the boundary delimiting the entire area of the image, a line whose length in the predetermined first direction is longest among the lengths of the extracted lines and is longer than a predetermined second threshold.

10. The image identification apparatus according to claim 9, wherein the predetermined second threshold is a threshold determined in accordance with a size of a recording medium if the image is a read image obtained by reading an image recorded on the recording medium.

11. The image identification apparatus according to claim 1, wherein the processor is further programmed to:

exclude, as the boundary delimiting the entire area of the image, a line that is extracted by the processor when the line is located in a predetermined peripheral region in the image.

12. The image identification apparatus according to claim 11, wherein the predetermined peripheral region is a peripheral region determined in accordance with a size of a recording medium if the image is a read image obtained by reading an image recorded on the recording medium.

13. The image identification apparatus according to claim 1, wherein the processor is further programmed to:
identify, as a table region, a region enclosed by a plurality of first lines substantially parallel to a predetermined first direction and a plurality of second lines substantially parallel to a second direction that intersects the first direction if the plurality of the first lines intersect the plurality of the second lines.

14. The image identification apparatus according to claim 1, wherein the processor is further programmed to:
calculate first coordinates of the boundary delimiting the entire area of the image in the image;
regard a plurality of regions as being aligned continuously in a predetermined first direction if the plurality of regions are aligned continuously in a second direction that intersects the first direction, each of the plurality of regions including a group of pixels of the extracted lines aligned continuously in the first direction; and
exclude the boundary delimiting the entire area of the image using the first coordinates of the boundary delimiting the entire area of the image.

15. The image identification apparatus according to claim 14, wherein the processor is further programmed to:
regard the plurality of regions as being aligned continuously in the first direction if a sum of lengths of the plurality of regions in the first direction is larger than or equal to a predetermined third threshold; and
calculate the first coordinates of the boundary delimiting the entire area of the image in the image.

16. The image identification apparatus according to claim 15, wherein the predetermined third threshold is a threshold determined in accordance with a size of a recording medium if the image is a read image obtained by reading an image recorded on the recording medium.

17. The image identification apparatus according to claim 1, wherein the processor is further programmed to:
calculate second coordinates of the boundary delimiting the entire area of the image in the image;
regard regions in the image as being aligned continuously in a predetermined first direction when the regions, each including a group of pixels of the extracted lines aligned continuously in the predetermined first direction, are aligned with one or more gaps interposed therebetween; and
exclude the boundary delimiting the entire area of the image using the second coordinates of the boundary delimiting the entire area of the image.

18. The image identification apparatus according to claim 17, wherein the processor is further programmed to:
regard the regions as being aligned continuously in the predetermined first direction when a ratio of a sum of lengths of the regions in the predetermined first direction to a sum of lengths of the one or more gaps in the predetermined first direction satisfies a predetermined requirement; and
calculate the second coordinates of the boundary delimiting the entire area of the image in the image.

19. A non-transitory computer readable medium storing a program causing a computer to execute a process for image identification, the process comprising:
extracting lines from an image;
excluding from objects to be identified a boundary delimiting an entire area of the image among the extracted lines; and
identifying as an object a plurality of lines that are among the extracted lines and that are not excluded if the plurality of lines are connected to each other.

20. An image identification apparatus comprising:
extraction means for extracting lines from an image;
exclusion means for excluding from objects to be identified a boundary delimiting an entire area of the image among the extracted lines; and
identification means for identifying as an object a plurality of lines that are among the extracted lines and that are not excluded by the exclusion means if the plurality of lines are connected to each other.

* * * * *